Figure 1:
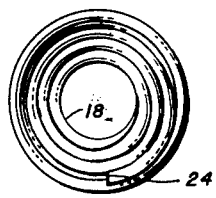

Nov. 4, 1952     M. H. RICHTER     2,616,684
CORD SPRING
Filed June 22, 1948

INVENTOR.
MAX H. RICHTER
BY
ATT'Y

Patented Nov. 4, 1952

2,616,684

UNITED STATES PATENT OFFICE 2,616,684

CORD SPRING

Max H. Richter, Chicago, Ill.

Application June 22, 1948, Serial No. 34,500

1 Claim. (Cl. 267—1)

This invention relates in general to a coil spring for surrounding a flexible cord or cable to prevent it from bending sharply at the point of attachment to an outlet, a fixture, plug or some other support.

The invention is more particularly described as a protector for an electric cord at its juncture with a fixture plug to which it is attached.

When an electric cord is attached to a terminal plug or to a movable part such as an electric iron, the loose portion of the cord is bent with relation to the connection plug or to the part to which it is attached as the cord and the part are relatively moved and it is common to provide a resilient support such as a cord spring which prevents the bending of the cord to be localized at its juncture with the plug or other part by spreading or extending the bending of the cord in an arc adjacent the point of attachment of the cord which thereby prevents the cord from being bent sharply at the point of entry or attachment to the plug or part with the result that much longer life and service is given to the cord.

The ordinary characteristic of a cord spring of this kind is to provide a plug attachment at one end and an open circular extremity at the other end consisting of closely wound spiral loops joined by an open helical coil which may be easily bent in all directions so that considerable flexibility is given to any cord or member contained within the spring and resulting in a bend of increased diameter so that the flexing and bending of the cord is not localized, but is extended depending upon the length of the loose spiral portion.

A common objection to this type of cord spring is that the outer bearing portion through which a cord extends is rough and uneven because of the cut end of the spring so that the edge of a cord engaging the outer portion of the spring will come in contact with the cut extremity of the spring more or less as the cord is flexed and bent which will soon result in tearing or otherwise disrupting the fabric or other coating of the cord at the locality of its departure from the cord spring.

The present invention relates to the provision of a cord spring in which the outer extremity is formed of a plurality of turns or coils of the wire sufficient in number to form a hollow ferrule at the outer end of the spring with closely wound turns of wire, but leaving a space between two turns of wire adjacent the extremity thereof into which the cut end of the wire is caused to enter and to be seated as a final position of the extremity. With the cut end enclosed therein so that the outer surface of the ferrule end is smooth and unobstructed, the cut end of the wire being disposed within and between the other wires where it does not come in contact with a cord or other member extending through the cord spring when the cord is bent and flexed with respect to and in connection with the cord spring.

The important object of the invention is therefore in the provision of a cord spring having an outer extremity in which the wire coils are so disposed with respect to each other, that this cut extremity of the wire is seated within and between other wire turns so that it cannot be engaged or contact by the bending of the cord spring or the bending of a cord contained therein when either the cord or the cord spring are relatively bent or flexed.

A further object of the invention is to provide an improved cord spring in which the outer or ferrule end is formed of a number of turns of wire seating the cut extremity of the wire between at least two of the wire turns and connecting the outer or ferrule end with the other end of the cord spring by means of a gradually decreasing open spiral winding.

Figure 2:
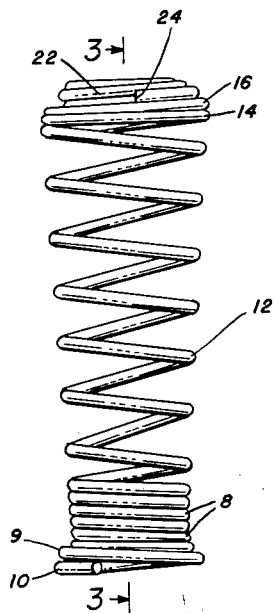
Figure 3:
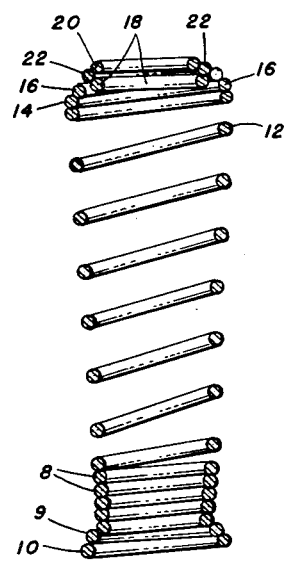

Other objects of the invention will appear in the specification and will be apparent from the accompanying drawings in which, Fig. 1 is a top or elevational view of the outer end of a cord spring in accordance with this invention;

Fig. 2 is a side elevation of the cord spring of which the top is shown in Fig 1; and Fig. 3 is a sectional view taken on the line 3—3 of Fig. 2.

Referring now more particularly to the drawings, a cord spring only in accordance with the invention is illustrated in the drawings without showing a cord passing through the spring, or the attachment of the spring at its inner end to an electric plug or another supporting member. In general, coil springs of this type are commonly used and are supplied to fixture makers by whom they are attached to the various electric cord units and electric fixtures. These cord springs are usually made upon automatic coiling machines which accurately form the springs with the desired number of turns both at the base and at the outer end with a certain number of open connecting coils and with an outer terminal in which the turns are accurately formed to produce the result as herein shown and described.

In the cord spring herein shown, the wire is coiled to provide a number of close spaced turns 8 at the base or inner end having one or more turns 9 and 10 at this extremity which project outwardly from the turn 8 to provide a projection resembling a flange which may be engaged and clamped between the opposite portions of a fixture plug or any other engaging and supporting part, leaving the outer portion of the cord spring free and projecting therefrom.

Extending outwardly from the close spaced turns at the inner end are a number of loose spiral turns 12, gradually increasing in diameter and in spacing apart outwardly from the inner end. At the outer end of the cord spring are a number of closely spaced turns 14, 16, 18, 20 and 22 ending in a cut extremity 24 which together form a closely adhering group of wire turns constituting a ferrule with an open end through which a flexible cord extends.

In this ferrule, the first or outermost coil 14 is of the largest diameter connected to the next coil 16 which is slightly smaller and is connected to an inner coil 18 which is within the ferrule. This coil is connected with an outer or top coil 20 which is substantially the inside diameter as the coil 18 together forming a substantial sizing opening for a cord to be inserted through the spring. The coil 20 is continued in a slightly larger coil 22 which is spaced from the next outer coil 16 so that the wire extremity 24 may be turned slightly inward and inserted between the adjacent but spaced apart outer wire turns 16 and 22, practically imbedding the extremity 24 between these turns so that this extremity does not project immediately beyond the outer edges of these adjacent turns and together they form a smooth outer surface which is not easily engaged by a conductor or a cord extending through the spring even though the cord or conductor is bent backwardly against the outer end ferrule thus formed and provided.

The operation and use of a cord spring of this kind is apparent and needs no further illustration or description of the application and use.

While a particular form of coil spring is illustrated, it is apparent that the form and proportions may be changed to meet different requirements, the spiral connecting coils may be made larger or longer and bulging outwardly, or they may be of uniform diameter connected to the outer ferrule.

The present form should be regarded by way of illustration and example rather than a limitation or restriction of the invention as various changes in the construction, combination, and arrangement of the parts may be made without departing from the spirit and scope of the invention.

I claim:

A cord spring composed of a plurality of turns of coiled wire close spaced at the ends and connected by loose-spaced coils between the ends, the turns at one end forming a close-spaced flange-like projection for attachment of the coil spring to a suitable support, close-spaced turns at the other end forming a ferrule with an inner wire opening, and an outer turn extending from the end inwardly leaving a space between two turns of wire adjacent the extremity approximately the diameter of the wire into which the end turn of the wire including the extremity of the wire is partially seated with the end of the wire extending inwardly between and protected by the said two adjacent turns so that this end of the wire will be spaced from the end of the ferrule where it does not come in contact with a cord extending through the ferrule and with the outer surface of this end of the ferrule smooth and unobstructed.

MAX H. RICHTER.

REFERENCES CITED

The following references are of record in the file of this patent:

UNITED STATES PATENTS

| Number | Name | Date |
|---|---|---|
| 2,161,084 | Peterson et al. | June 6, 1939 |
| 2,250,042 | Sundt et al. | July 22, 1941 |